United States Patent
Peterson

(10) Patent No.: US 9,204,751 B2
(45) Date of Patent: Dec. 8, 2015

(54) BEVERAGE FORMATION APPARATUS AND METHOD USING SONIC ENERGY

(75) Inventor: Peter Peterson, Waterbury, VT (US)

(73) Assignee: Keurig Green Mountain, Inc., Waterbury, VT (US)

( * ) Notice: Subject to any disclaimer, the term of this patent is extended or adjusted under 35 U.S.C. 154(b) by 1163 days.

(21) Appl. No.: 12/971,535

(22) Filed: Dec. 17, 2010

(65) Prior Publication Data

US 2011/0151075 A1    Jun. 23, 2011

Related U.S. Application Data

(60) Provisional application No. 61/284,477, filed on Dec. 18, 2009, provisional application No. 61/335,083, filed on Dec. 31, 2009.

(51) Int. Cl.
| | |
|---|---|
| *A23F 5/36* | (2006.01) |
| *A47J 31/36* | (2006.01) |
| *A47J 31/00* | (2006.01) |
| *A47J 31/44* | (2006.01) |
| *B65D 85/804* | (2006.01) |

(52) U.S. Cl.
CPC ............ *A47J 31/3623* (2013.01); *A47J 31/002* (2013.01); *A47J 31/44* (2013.01); *B65D 85/8043* (2013.01)

(58) Field of Classification Search
CPC ......... A47J 31/00; A47J 31/02; A47J 31/002; A47J 31/007; A47J 31/057; A47J 31/0626; A47J 31/0642; A47J 31/0668; A47J 31/0673; A47J 31/0689; A47J 31/10
USPC .................................... 426/238, 433, 435, 77
See application file for complete search history.

(56) References Cited

U.S. PATENT DOCUMENTS

| | | | |
|---|---|---|---|
| 4,581,239 A | 4/1986 | Woolman et al. | |
| 4,779,520 A | 10/1988 | Hauslein | |
| 4,983,412 A | 1/1991 | Haeuslein | |
| 4,984,511 A | 1/1991 | Sekiguchi | |
| 5,840,189 A * | 11/1998 | Sylvan et al. | 210/474 |
| 2002/0148357 A1 | 10/2002 | Lazaris et al. | |
| 2005/0266122 A1 | 12/2005 | Franceschi | |

(Continued)

FOREIGN PATENT DOCUMENTS

| | | |
|---|---|---|
| CN | 1750980 A | 3/2006 |
| DE | 2111996 A1 | 9/1972 |

(Continued)

OTHER PUBLICATIONS

International Search Report and Written Opinion of the International Searching Authority in related Application No. PCT/US2012/042586, dated Sep. 28, 2012.

(Continued)

*Primary Examiner* — Steven Leff
(74) *Attorney, Agent, or Firm* — Wolf, Greenfield & Sacks, P.C.

(57) ABSTRACT

Apparatus and method for forming beverages using a beverage cartridge and sonic energy. A cartridge may include a sonic receiver, such as a feature that extends into an interior space of the cartridge and is arranged to receive a sonic emitter that introduces sonic energy into the interior space. The sonic receiver may be excited by sonic energy, which causes the sonic receiver to itself introduce sonic energy into the cartridge.

11 Claims, 6 Drawing Sheets

(56) References Cited

U.S. PATENT DOCUMENTS

| | | |
|---|---|---|
| 2008/0032030 A1 | 2/2008 | Babaev |
| 2009/0004351 A1 | 1/2009 | Maurer |
| 2010/0288131 A1 | 11/2010 | Kilber et al. |

FOREIGN PATENT DOCUMENTS

| | | |
|---|---|---|
| DE | 29713279 U1 | 5/1998 |
| GB | 2268392 A | 1/1994 |
| GB | 2447579 A | 9/2008 |
| JP | S56-06316 | 6/1954 |
| JP | S56-14603 | 7/1954 |
| JP | S51-21969 | 2/1976 |
| JP | S64-27432 A | 1/1989 |
| JP | H8-281020 A | 10/1996 |
| JP | 2002-238766 A | 8/2002 |
| WO | WO 02/19875 A1 | 3/2002 |
| WO | WO 2004/071899 A1 | 8/2004 |
| WO | WO 2009/084059 A1 | 7/2009 |
| WO | WO 2010/002828 A1 | 3/2010 |

OTHER PUBLICATIONS

International Search Report and Written Opinion for International Application No. PCT/US2010/061002 dated Feb. 28, 2011.

* cited by examiner

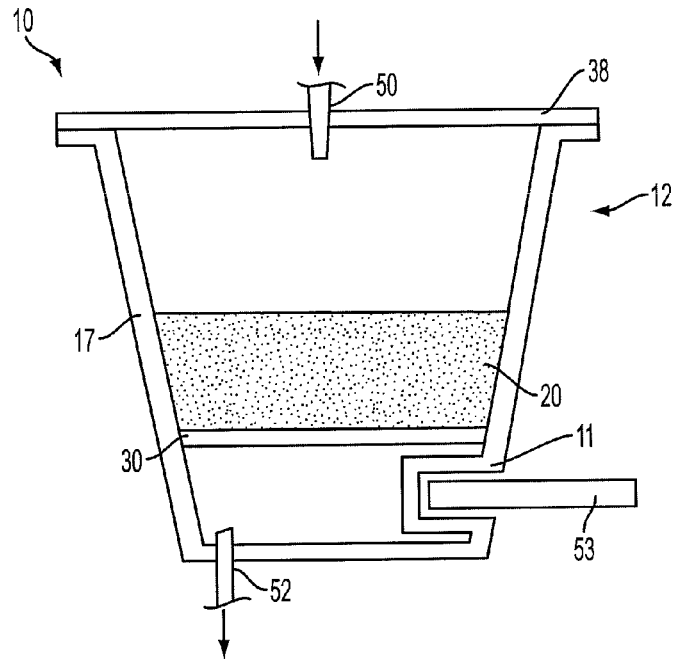
FIG. 4
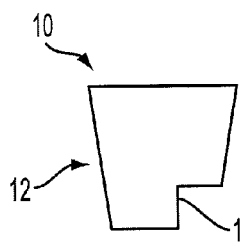 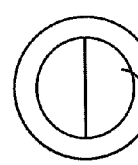
FIG. 5    FIG. 6
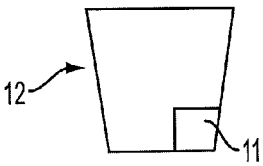 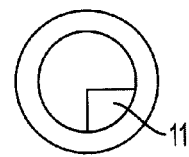
FIG. 7    FIG. 8
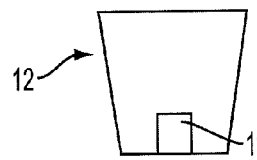 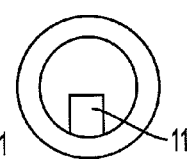
FIG. 9    FIG. 10
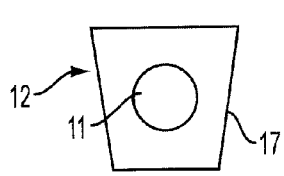 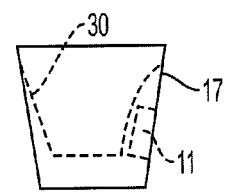
FIG. 11    FIG. 12
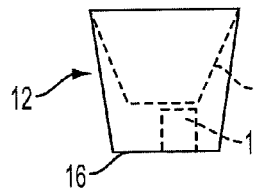 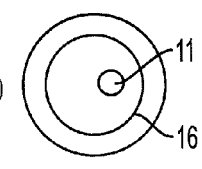
FIG. 13    FIG. 14
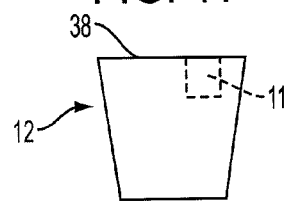 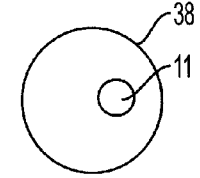
FIG. 15    FIG. 16

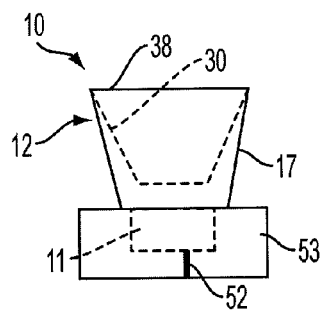
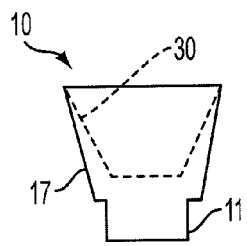
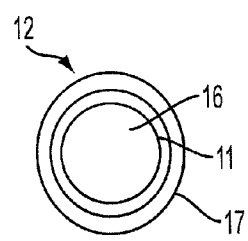
FIG. 17　　　　FIG. 18　　　　FIG. 19
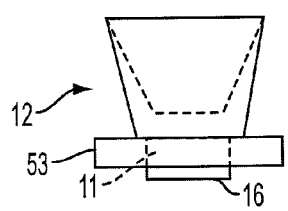
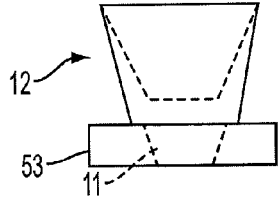
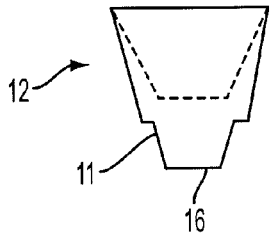
FIG. 20　　　　FIG. 21　　　　FIG. 22
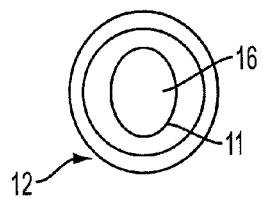
FIG. 23

BEVERAGE FORMATION APPARATUS AND METHOD USING SONIC ENERGY

This application claims the benefit of U.S. Provisional applications 61/284,477, filed Dec. 18, 2009 and 61/335,083, filed Dec. 31, 2009.

BACKGROUND

Various patents describe the use of sonic energy when brewing coffee, including U.S. Pat. No. 4,779,520, U.S. Pat. No. 4,983,412, and U.S. Patent Publication 20080032030 which describe applying ultrasonic energy to the exterior of a drip-brewing funnel and/or directly to the coffee grounds and water at the interior of the funnel. However, applying ultrasonic energy to the exterior of a brew funnel will not necessarily allow for suitable control of the sonic energy at the interior of the brew funnel, e.g., resulting in some areas receiving energy of a different intensity and/or frequency than other areas. Also, applying sonic energy to the interior of a brew funnel may in some cases to cause erosion of an ultrasonic probe having a metal exterior, resulting in the possibility that eroded material is deposited in the coffee grounds or other beverage medium.

SUMMARY OF INVENTION

Aspects of the invention relate to applying sonic energy to the interior of a beverage cartridge that contains a beverage medium and a liquid introduced into the cartridge interior. The cartridge may be arranged to have a sonic receiver that receives sonic energy for introduction into the interior space of the cartridge. For example, the sonic receiver may include an acoustically compliant portion of the cartridge that vibrates or otherwise moves in response to the sonic energy so as to itself transmit sonic energy to the cartridge interior. In some embodiments, the sonic receiver may include an acoustically transparent portion, an acoustic coupling medium, a depression or other feature to interact with a sonic emitter, or other feature to allow the sonic emitter to transmit sonic energy directly into the cartridge. The sonic receiver may be arranged to direct sonic energy to particular areas of the interior space of the cartridge, focus, disperse or otherwise modify the sonic energy to make the intensity of the sonic energy more uniform in at least parts of the interior space, and/or have other affects on the sonic energy. This may help avoid problems associated with having sonic energy concentrated in one or more areas, such as tunneling where the sonic energy effectively forms a pathway in a beverage medium through which liquid may "short circuit" or pass through the cartridge without sufficiently contacting the beverage medium. Tunneling can cause a resulting beverage to be weak because of the insufficient contact of liquid with the beverage medium.

In one aspect of the invention, a beverage cartridge arranged for use in a beverage forming machine to make a beverage may include a container having a closed interior space and a beverage medium located in the interior space. The beverage medium may be used to form a beverage by interaction of the beverage medium with a liquid introduced into the interior space and may include, for example, roast and ground coffee, sweeteners, creamers, instant drink mixes, and other soluble and/or insoluble materials. A sonic receiver may be associated with the container (e.g., formed as an integrally molded part) and arranged to transmit sonic energy from a sonic emitter located outside of the closed interior space into the interior space for interaction with the beverage medium.

For example, the sonic receiver may include a depression formed in the container arranged to receive a sonic emitter. Thus, a probe-like sonic emitter may be extended into the depression and used to emit sonic energy into the cartridge interior space. By having at least a portion of the cartridge positioned around the sonic emitter, sonic energy may be more efficiently transmitted to the cartridge and into the interior space. In another embodiment, the sonic receiver may include a portion of the container arranged to be inserted into a recess of a sonic emitter. For example, the container may include a protrusion that is received by a sonic emitter. By having the sonic emitter at least partially surround a portion of the cartridge, sonic energy may be more efficiently transmitted to the cartridge and/or into the interior space. The sonic receiver may be arranged at a sidewall of the container, e.g., taking the form of a notch or other depression to receive a sonic emitter, at a lid of the container, and/or at other portions of the container. In some embodiments, the sonic receiver may include an acoustic coupling medium, such as water, a gel, or other substance, that helps to transmit sonic energy from the sonic emitter to the interior of the cartridge. In some embodiments, the sonic receiver may include an acoustically compliant portion of the cartridge, e.g., that may act like a "speaker" such that sonic energy from the sonic emitter causes the acoustically compliant portion to vibrate or otherwise move, which causes sonic energy to be introduced into the interior space of the cartridge.

The cartridge may take a variety of different forms, such as having the container include a cup with a top opening and a lid attached to the cup that closes the top opening. The cup may have a cylindrical shape, a cubic shape, conical or frustoconical shape, partial spherical shape, tetrahedral shape, or others. The cup may be made as a single part, e.g., a single thermoformed piece of plastic, or may be made of multiple parts that are joined together. For example, a cup may include a cylindrical wall member that has a flat plate or foil member attached to one end of the cylindrical wall. Similarly, the lid may be arranged in any suitable way, e.g., may include a single part such as a layer of laminated foil, multiple parts joined together, and so on. In addition, the cartridge may include a filter element arranged to filter at least part of a beverage formed by interaction of the beverage medium with liquid. For example, the filter element may include a filter paper attached to the interior of the container and arranged so that liquid interacting with the beverage medium passes through the filter before exiting the cartridge.

In another aspect of the invention, a beverage forming system includes a cartridge receiver arranged to hold a beverage cartridge, a liquid inlet (such as a needle that pierces the cartridge) arranged to introduce liquid into the beverage cartridge, and a sonic emitter arranged to provide sonic energy to the beverage cartridge. A beverage cartridge may be held by the cartridge receiver and have an arrangement like that described above, e.g., including a container having a closed interior space, a beverage medium located in the interior space, and a sonic receiver associated with the container and arranged to transmit sonic energy from the sonic emitter into the interior space for interaction with the beverage medium.

The sonic emitter may take any one of a variety of forms, such as a probe that is positioned adjacent a portion of the cartridge, e.g., at a depression in the container. The sonic emitter may be arranged to excite an acoustically compliant portion of the cartridge so as to cause the acoustically compliant portion to introduce sonic energy to the interior space of the cartridge. Sonic energy introduced by the acoustically compliant portion may be in addition to sonic energy that is transmitted through the cartridge container and into the interior space. As used herein, "sonic energy" includes energy audible to the human ear as well as energy outside of the range of hearing of the human ear. For example, "sonic energy" or "acoustic energy" can include energy having a frequency of about 10 Hz to about 200 kHz or more.

In another aspect of the invention, a method of forming a beverage includes providing a beverage cartridge arranged for use in a beverage forming machine to make a beverage. The cartridge may include a container having a closed interior space and a beverage medium located in the interior space. Liquid may be introduced into the closed interior space of the cartridge, and sonic energy transmitted into the closed interior space of the cartridge while liquid introduced into the closed interior space is present in the cartridge. Accordingly, a beverage may be formed by simultaneous interaction of the liquid and sonic energy with the beverage medium.

In some illustrative methods for forming a beverage, the cartridge may include a sonic receiver attached to the container and arranged to transmit sonic energy from a sonic emitter located outside of the closed interior space into the interior space for interaction with the beverage medium. For example, the sonic receiver may include a depression in a sidewall of the container, an acoustically compliant portion of the cartridge that is excited by sonic energy, or other suitable arrangement. Alternately, a sonic emitter may be located inside of the interior space of the cartridge, e.g., by passing an ultrasonic probe through the cartridge container. Liquid may be introduced into the interior space of the cartridge by piercing the container, and injecting liquid into the closed interior space. The sonic energy introduced into the cartridge may cause materials to pass through a filter in the cartridge that would not otherwise pass through the filter in the absence of the sonic energy. For example, the inventors have found that a beverage having a higher level of dissolved and/or suspended materials than would otherwise be present in the absence of the sonic energy may be created. With respect to a coffee beverage, the beverage may have a turbidity and/or a level of total dissolved solids that is higher than would be present in the absence of the sonic energy. In some embodiments, the sonic energy may cause the flow of beverage medium and liquid in the interior space. For example, the sonic energy may be arranged to cause a circulating or other flow of liquid and beverage medium in the interior space that would otherwise not occur. Such flow may help with extraction, dissolution or other processes involved in making a beverage, e.g., by improving wetting of the beverage medium.

These and other aspects of the invention will be apparent from the following description and claims.

BRIEF DESCRIPTION OF THE DRAWINGS

Aspects of the invention are described with reference to the following drawings in which like numerals reference like elements, and wherein:

FIG. 4 shows a cross sectional view of another illustrative embodiment of a cartridge in accordance with an aspect of the invention;

FIGS. 5 and 6 show a front view and a bottom view, respectively, of yet another illustrative embodiment of a cartridge in accordance with an aspect of the invention;

FIGS. 7 and 8 show a front view and a bottom view, respectively, of yet another illustrative embodiment of a cartridge in accordance with an aspect of the invention;

FIGS. 9 and 10 show a front view and a bottom view, respectively, of yet another illustrative embodiment of a cartridge in accordance with an aspect of the invention;

FIGS. 11 and 12 show a front view and a left side view, respectively, of yet another illustrative embodiment of a cartridge in accordance with an aspect of the invention;

FIGS. 13 and 14 show a front view and a bottom view, respectively, of yet another illustrative embodiment of a cartridge in accordance with an aspect of the invention;

FIGS. 15 and 16 show a front view and a top view, respectively, of yet another illustrative embodiment of a cartridge in accordance with an aspect of the invention;

FIGS. 17, 18 and 19 show a front view with a sonic emitter, a front view without sonic emitter and bottom view of yet another illustrative embodiment of a cartridge in accordance with an aspect of the invention;

FIG. 20 is a perspective view of the FIG. 17 embodiment with a modified sonic emitter;

FIGS. 21, 22 and 23 show a front view with a sonic emitter, a front view without sonic emitter and bottom view of yet another illustrative embodiment of a cartridge in accordance with an aspect of the invention;

DETAILED DESCRIPTION

It should be understood that aspects of the invention are described herein with reference to the figures, which show illustrative embodiments. The illustrative embodiments described herein are not necessarily intended to show all embodiments in accordance with the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

Figure 1:
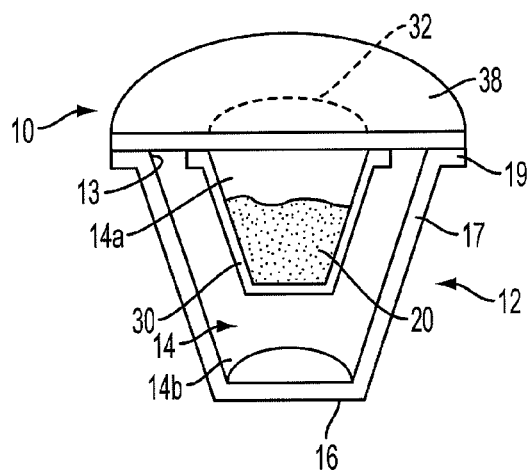
FIG. 1 is a side cross-sectional view of a cartridge in accordance with aspects of the invention.
Figure 2:
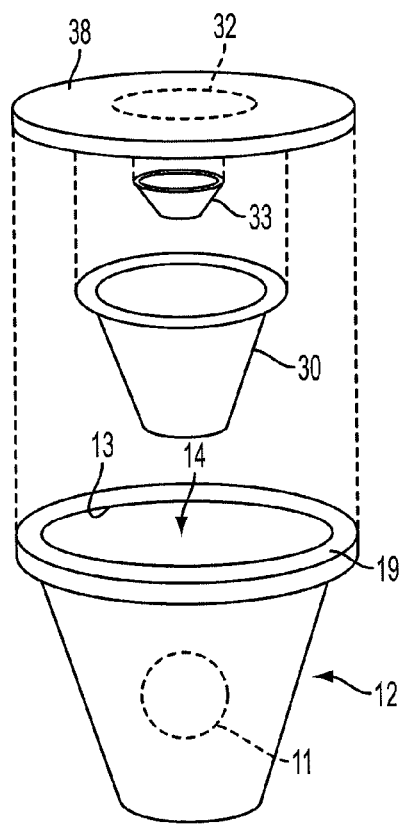
FIG. 2 is an exploded perspective view of the cartridge of FIG. 1.

FIGS. 1 and 2 show a side cross-sectional view and an exploded perspective view, respectively, of an illustrative cartridge 10 that incorporates one or more aspects of the invention. The cartridge 10 may be used in a beverage machine to form any suitable beverage such as tea, coffee, other infusion-type beverages, beverages formed from a liquid or powdered concentrate, carbonated beverages, etc. Thus, the cartridge 10 may contain any suitable beverage medium 20, e.g., ground coffee, tea leaves, dry herbal tea, powdered beverage concentrate, dried fruit extract or powder, powdered or liquid concentrated bouillon or other soup, powdered or liquid medicinal materials (such as powdered vitamins, drugs or other pharmaceuticals, nutriceuticals, etc.), and/or other beverage-making material (such as powdered milk or other creamers, sweeteners, thickeners, flavorings, and so on). In one illustrative embodiment, the cartridge 10 contains a beverage medium 20 that is configured for use with a machine that forms coffee and/or tea beverages, however, aspects of the invention are not limited in this respect.

Although illustrative embodiments of cartridges are shown in the drawings, as used herein, a "cartridge" may take any suitable form, such as a pod (e.g., opposed layers of filter paper encapsulating a beverage medium), capsule, sachet or any other arrangement. The cartridge may be impervious to air and/or liquid, or may allow water and/or air to pass into the cartridge. The cartridge may include a filter or other arrangement to help prevent some portions of the beverage medium from being provided with the formed beverage, such as a coffee drink, tea, hot chocolate, etc. To "brew" a beverage as used herein includes infusion, mixing, dissolving, steeping or otherwise forming a drinkable substance using water or other beverage precursor (e.g., flavored or otherwise treated water, or other liquid whether heated or not) with a beverage medium. Also, reference to "water" herein is to any suitable water formulation, e.g., filtered, deionized, softened, carbonated, etc., as well as any other suitable precursor liquid used to form a beverage, such as sweetened or flavored water, milk, etc.

In this illustrative embodiment, the cartridge 10 includes a container 12 that includes an interior space 14 having a first chamber 14a and a second chamber 14b that are separated by a filter 30. It should be understood, however, that other additional chambers in the interior space and/or sub-portions or areas of the first and second chambers, may be provided in other embodiments. For example, this embodiment also includes a flow distributor 33 that may help to distribute incoming liquid across the beverage medium 20, and thus the flow distributor 33 may define an area between the flow distributor 33 and the lid 38. Also, it is possible for the cartridge to have three spaces that separated by two filters (e.g., a first filter separates two portions of a first chamber and a second filter separates the first and second chambers), and so on. In another embodiment, the first or second chamber may be separated into two portions by a venturi or other feature that introduces air into a beverage. Thus, the first and/or second chambers may be divided or otherwise separated into two or more portions or areas by filters, walls, dividers, passageways, and other features. Also, it should be appreciated that the cartridge 10 need not include a filter 30, but instead may be filterless.

If the container 12 includes an opening 13 like that shown in FIGS. 1 and 2, the opening 13 may be closed by a lid 38, e.g., a foil and polymer laminate material that is attached to a rim 19 of the container 12. (Although in this embodiment the rim 19 is arranged as an annular flange-like element, the rim 19 may be arranged in other ways. For example, the rim 19 may be the top edge of the sidewall 17 without any flange element.) The container 12 and/or the lid 38 may provide a barrier to moisture and/or gases, such as oxygen. For example, the container 12 may be made of a polymer laminate, e.g., formed from a sheet including a layer of polystyrene or polypropylene and a layer of EVOH and/or other barrier material, such as a metallic foil. Such an arrangement may provide suitable protection for the beverage medium 20, e.g., from unwanted exposure from moisture, oxygen and/or other materials. It should be understood, however, that the container 12 and/or the lid 38 may be made of other materials or combinations of materials, such as biopolymers, compostable polymers, paper, foils, etc.

In accordance with an aspect of the invention, the cartridge 10 may include sonic receiver 11 (see FIG. 2), such as an acoustically compliant portion that receives sonic energy from a sonic emitter which causes the acoustically compliant portion to vibrate or otherwise move. This movement of the acoustically compliant portion may introduce sonic energy into the interior space 14 to interact with the beverage medium 20, a filter 30 (if present) and/or liquid in the interior space 14. The acoustically compliant portion may take any suitable form, which may depend on the arrangement of a sonic emitter used to excite the acoustically compliant portion. For example, the acoustically compliant portion in this illustrative embodiment includes a part of a sidewall 17 arranged to vibrate in response to acoustic energy, but an acoustically compliant portion or other sonic receiver 11 may be arranged at the bottom 16 and/or lid 38 of the container 12. Thus, the material used to form the acoustically compliant portion, the physical shape, thickness or other characteristics of the acoustically compliant portion may be carefully arranged to be excited by acoustic energy so as to provide a desired sonic energy into the interior space 14. For example, a portion of the sidewall 17 may be caused to vibrate by a sonic emitter, which in turn causes the portion of the sidewall 17 to create or otherwise introduce sonic energy into the interior space 14. As discussed in more detail below, the sonic receiver 11 need not include an acoustically compliant section, but rather may be arranged to receive, couple with, or otherwise interact with a sonic emitter that introduces sonic energy into the cartridge 10.

Also, although in this embodiment, the sonic receiver 11 is arranged to cooperate with a sonic emitter that is located outside of the cartridge 10, the sonic receiver 11 may be arranged to cooperate with a sonic emitter located inside of the cartridge 10. For example, a sonic probe inserted into the interior space 14 may emit sonic energy which excites an acoustically compliant portion of the container. In turn, the excitation of the acoustically compliant portion may itself introduce sonic energy into the interior space, optionally at the same or a different frequency and/or intensity as the sonic energy emitted by the probe. This feature may be exploited to help provide desired acoustic energy in the interior space, whether at a desired frequency or amplitude. Moreover, the sonic receiver(s) 11 may be used make the sonic energy more uniform or otherwise distributed in the interior space. For example, whereas a single sonic probe may in some cases form a tunnel or channel in a beverage medium because of the concentration of sonic energy in a narrow area, the sonic receiver(s) 11 may help to more uniformly distribute sonic energy in the interior space 14, thus helping to avoid any tunneling or unwanted concentration of sonic energy in one or more areas. Of course, the sonic receiver(s) 11 may be used to help make sonic energy in the interior space more uniform or have other desired characteristics by interacting with a sonic emitter located outside of the interior space 14.

Although in this illustrative embodiment the container 12 has a generally frustoconical shape with a flat lid, the container 12 may have a fluted, conical, or cylindrical shape, may be in the form of a square or rectangular cup, a domed cup, a sphere or partial sphere, or other suitable form, may have a fluted, corrugated, or otherwise shaped sidewall, and so on. Also, the container 12 need not necessarily have a defined shape, as is the case with some beverage sachets and pods. For example, although the container 12 in this embodiment has a relatively rigid and/or resilient construction so that the container 12 tends to maintain its shape, the container 12 could be made to have a more compliant and/or deformable arrangement, e.g., like a sachet container made from a sheet of deformable material. Thus, an interior space defined by the container 12 may be formed only after the container material is formed around a beverage medium, filter and/or other cartridge components, similar to when two filter paper layers (container material) are joined together around a charge of coffee grounds to form a pod or other form of cartridge. In other embodiments, the size and/or shape of the cartridge container 12 may be defined by the brew chamber in which the cartridge 10 is held.

If provided, the filter 30 may be attached to the lid 38 at a periphery 32 that is spaced inwardly and away from the rim 19. In addition, the filter 30 may extend from the periphery 32 at least partially into the interior space 14. The filter 30 may function to remove materials over a certain size from a liquid, e.g., may remove coffee grounds from liquid in the first chamber 14a, allowing a coffee beverage to pass through the filter 30 to the second chamber 14b. For example, the filter may include a piece of filter paper that is arranged to allow a liquid and dissolved and/or suspended materials of a certain size to pass, yet prevent relatively large particles from flowing through the filter. Of course, the filter 30 may have multiple stages, e.g., a coarse filter portion that filters out relatively large particles, followed by a fine filter portion that filters relatively smaller particles, and so on. In addition, the filter 30 may include one or more portions that function to filter liquid passing through the filter 30, as well as portions that are impermeable or otherwise restrict flow. Thus, the filter 30 may include two or more separate components, if desired. For example, the filter 30 may include a rigid, impermeable plastic sleeve that is attached to the lid 38 at the periphery 32. At a location away from the lid 38, a porous filter paper may be attached to the sleeve. Thus, not all portions of the filter need be permeable to liquids. The filter 30 may also have areas with different permeability, e.g., to help direct flow toward one or more areas of the filter 30. For example, regions of the filter 30 near the lid 38 in FIG. 1 may have a relatively lower permeability as compared to regions further away from the lid 38. This may help encourage flow through the beverage medium 20 toward lower regions of the filter 30, potentially improving the dissolution of materials in the medium 20 into the liquid.

As described in more detail below, the operation of the filter may be influenced by sonic energy in the interior space, e.g., materials that would otherwise not pass through the filter may be caused to pass by the sonic energy. For example, attaching the filter 30 to the lid 38 may be useful in some embodiments where a portion of the lid 38 functions as an acoustically compliant portion. That is, a sonic emitter may excite a portion of the lid 38, and since the lid 38 may be connected to the filter 30, both the filter and lid 38 may be excited so as to introduce sonic energy into the interior space 14. Sonic excitation of the filter 30 may help certain materials pass through the filter 30 that would otherwise not pass through the filter in the absence of sonic energy. Of course, the filter 30 may be sonically excited in other ways, such as by transmitting acoustic energy through the cartridge sidewall 17.

In another aspect of the invention, the filter 30 may also, or alternately, function to help prevent the movement of materials from the second chamber 14b to the first chamber 14a, and/or help position certain beverage materials in the interior space 14 for sonic treatment. For example, the cartridge 10 may include a beverage medium 20 in the second chamber 14b and no beverage medium 20 in the first chamber 14a. In this case, the filter 30 may help maintain the beverage medium 20 near the bottom 16 and/or sidewall 17. Such positioning of the beverage medium 20 may help expose the beverage medium to desired acoustic energy, e.g., if the energy is introduced from the sidewall 17 and/or bottom 16. For example, some beverage media 20, such as powdered drink mixes, can tend to clump and may clog or otherwise foul a beverage outlet if not properly dissolved. By suitably exposing the drink mix to acoustic energy near the bottom 16 or sidewall 17 of the cartridge 10, the drink mix may dissolve or otherwise go into solution more quickly or effectively than would otherwise occur. For example, the inventors have discovered that introducing acoustic energy into the interior space 14 of a cartridge 10 can cause flow of the beverage medium 20 and liquid that would not occur in the absence of such energy. In some cases, the swirling or other flow can help dissolve a beverage medium or otherwise improve contact of the medium with a liquid.

Figure 3:
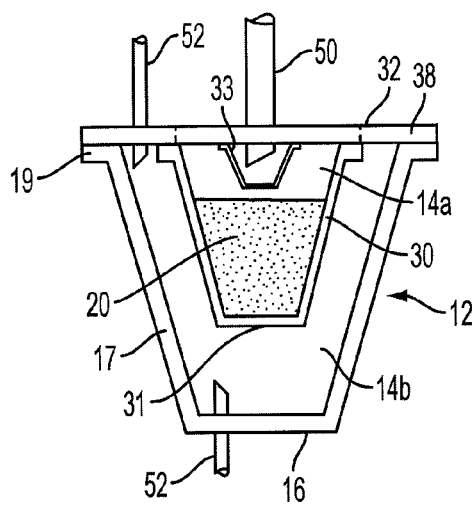
FIG. 3 is a side cross-sectional view of the cartridge of FIG. 1 after a surface of the cartridge is pierced by a piercing element.

When using the cartridge 10 to form a beverage, the lid 38 and/or the container 12 may be pierced to introduce liquid into the cartridge and receive beverage from the cartridge. (As used herein, "beverage" refers to a liquid substance intended for drinking that is formed when a liquid interacts with a beverage medium. Thus, beverage refers to a liquid that is ready for consumption, e.g., is dispensed into a cup and ready for drinking, as well as a liquid that will undergo other processes or treatments, such as filtering or the addition of flavorings, creamer, sweeteners, another beverage, etc., before being consumed.) To introduce liquid into the cartridge, for example, as shown in FIG. 3, a portion of the lid 38 generally circumscribed by the periphery 32 where the filter 30 (if present) is attached to the lid 38 may be pierced by an inlet piercing element 50 (e.g., a needle) so that water or other liquid may be injected into the cartridge 10. Of course, other piercing approaches may be used, e.g., where the filter 30 is attached to the container sidewall 17. Other inlet piercing arrangements are possible, such as multiple needles, a shower head, a non-hollow needle, a cone, a pyramid, a knife, a blade, etc. A beverage machine that uses the cartridge may include multiple piercing elements of the same type or of different types, as the invention is not limited in this respect. In another arrangement, a beverage machine may include a piercing element (such as a spike) that forms an opening and thereafter a second inlet element (such as a tube) may pass through the formed hole to introduce liquid into (or conduct liquid out of) the container. For those arrangements in which the cartridge is pierced, a sonic emitter may be introduced into the interior space 14. For example, a piercing element 50 (e.g., needle) may function to pierce the cartridge, introduce water into the cartridge, and emit sonic energy in the interior space 14. Thus, a piercing inlet needle may function as a sonic emitter as well as provide liquid into the container. In other embodiments, the lid 38 may be pierced, or otherwise effectively opened for flow, by introducing pressure at an exterior of the lid 38. For example, a water inlet may be pressed and sealed to the lid 38 exterior and water pressure introduced at the site. The water pressure may cause the lid 38 to be pierced or otherwise opened to allow flow into the cartridge 10. In another arrangement, the lid 38 may include a valve, conduit or other structure that opens when exposed to a suitable pressure and/or when mated with a water inlet tube or other structure. In such cases the water (or other liquid) inlet may still function as a sonic emitter, although the liquid inlet may not extend into the interior space 14.

The cartridge 10 may also be penetrated by an outlet piercing element 52 (e.g., a needle) at a bottom 16 of the container 12, or at a second portion of the lid 38 outside of the periphery 32 and apart from the inlet opening, or at another portion of the cartridge 10, such as the sidewall 17. (The liquid inlet may similarly be located at any suitable place or places on the cartridge 10.) As with the inlet piercing arrangement, the outlet piercing arrangement may be varied in any suitable way. Thus, the outlet piercing element 52 may include one or more hollow or solid needles, knives, blades, tubes, and so on. Such piercing elements 52 may also function as a sonic emitter, or open a path through which a sonic emitter may enter the interior space or otherwise communicate with the cartridge 10. Alternately, the cartridge 10 may include a valve, septum or other element that opens to permit beverage to exit when liquid is introduced into the cartridge, but otherwise remains closed (e.g., to protect the beverage medium from external conditions such as oxygen, moisture or others). In such a case, no piercing element for forming the outlet opening is necessarily required although may be used, e.g., to allow the valve or other element to open. Also, in this illustrative embodiment the piercing element 52 remains in place to receive beverage as it exits the opening formed in the container 12 or lid 38. However, in other embodiments, the piercing element 52 may withdraw after forming an opening, allowing beverage to exit the opening and be received without the piercing element 52 being extended into the cartridge 10.

Although the embodiments described above include a beverage medium 20 only in the first chamber 14a, or only in the second chamber 14b, the cartridge 10 may include a beverage medium (either the same or different) in both chambers or other portions of the cartridge. For example, a cartridge may include roast and ground coffee in the first chamber 14a, and a creamer and sweetener in the second chamber 14b, enabling the cartridge to form a cappuccino- or latte-like beverage. In another embodiment, the first chamber 14a may include coffee grounds and the second chamber 14b may include a hot chocolate material, allowing the cartridge to form a mocha-type beverage. Other combinations will occur to those of skill in the art, such as leaf tea in the first chamber and a dried fruit material in the second chamber, a dried fruit material in the first chamber and creamer/sweetener in the second chamber, and so on. In some embodiments, another filter may be provided, e.g., to separate beverage media in the second chamber from the fluid outlet. For example, a filter may be attached to the lid 38 in an area where an outlet needle pierces the lid 38 to allow beverage to exit the cartridge, but only after passing through the additional filter. The selection of which beverage media to place in which areas of the cartridge 10 may be made based on the desired acoustic treatment to be given the beverage media. For example, certain hard-to-dissolve beverage media may be located so as to experience a relatively higher acoustic energy intensity, whereas other beverage media may be located in lower intensity regions. Thus, the cartridge interior space 14 may have regions with different acoustic energy characteristics, and those acoustic energy characteristics may be tuned or otherwise controlled for particular beverage media or other affects on beverage media.

FIG. 4 shows another illustrative embodiment of a cartridge 10 which in this case includes a sonic receiver 11 located at the sidewall 17 of the container 12. The sonic receiver 11, which may be arranged as a notch, recess or other depression in the container 12, receives a sonic emitter 53, which in this instance has the form of an ultrasonic probe. The depression may have any suitable configuration, e.g., may be tapered so as to closely fit with a tapered end of the sonic emitter 53, may include an acoustically compliant portion that vibrates in response to sonic energy emitted by the sonic emitter 53, may be substantially transparent to sonic energy emitted by the emitter 53 so as to have minimal attenuation on the energy, may provide an acoustic coupling between the emitter 53 and the interior space (e.g., the sonic receiver 11 may include a suitable acoustic gel, water or other substance that functions as an acoustic coupling medium), etc. Of course, the shape and size of the depression may vary, e.g., the depression may have a round, square, rectangular, triangular, etc., cross sectional shape, may be sized to interact with the sonic emitter 53 in a desired way, may be formed of a different material than other portions of the container 12 (e.g., may include an element with desired acoustic characteristics that is molded into the sidewall 17), and so on. In this case, the sonic receiver 11 is located below a filter 30 (e.g., downstream of the filter 30), but may be arranged to be adjacent to or in immediate contact with the beverage medium 20, the filter 30 or other components of the cartridge 10. Sonic energy emitted by the sonic emitter 53 and/or by an acoustically compliant portion of the cartridge 10 may be in the about 10 to 200 kHz range with any suitable intensity, although other frequency ranges and/or intensities are possible.

By having the sonic emitter extend into a depression in the container 12, the sonic emitter 53 may effectively be located inside the cartridge while actually remaining outside of the interior space 14. That is, since the depression may extend into the interior space 14 of the cartridge 10, the sonic emitter 53 may be located so as to effectively introduce sonic energy from within the interior space 14, rather than effectively introducing the sonic energy from outside of the interior space. This arrangement may allow the sonic emitter 53 to provide may uniform sonic energy to the interior space, may permit sonic energy to be concentrated in certain areas of the interior space, and so on. Thus, the sonic emitter 53 in arrangements like that in FIG. 4 may be able to function in a way similar to a sonic emitter that pierces the cartridge and extends into the interior space, but without the potential disadvantages of a piercing probe, such as potential contamination of the beverage, leaking from the emitter piercing site, damage to the sonic emitter by contacting the beverage medium and/or liquid, etc. In addition, the sonic receiver 11 may focus, diffuse, redirect, or otherwise change the way the sonic energy is introduced in the interior space. For example, the sonic receiver 11 may receive diffuse sonic energy, and focus that energy into a suitable area or zone in the interior space 14.

FIGS. 5 through 16 show various additional embodiments of a cartridge 10 having different sonic receiver arrangements. However, it should be understood that these illustrative embodiments are not intended to provide an exhaustive review of all possible ways in which an sonic receiver could be arranged in accordance with aspects of the invention. For example, FIG. 5 shows a front view and FIG. 6 shows a bottom view of a cartridge 10 that includes a sonic receiver 11 in the form of a notch or step at a lower right side of the container 12. FIG. 7 shows a front view and FIG. 8 shows a bottom view of a cartridge 10 that includes a sonic receiver 11 in the form of a notch located at a lower, front right side of the container 12. FIG. 9 shows a front view and FIG. 10 shows a bottom view of a cartridge 10 that includes a sonic receiver 11 in the form of a notch at a lower front, center of the container 12. FIG. 11 shows a front view and FIG. 12 shows a left side view of a cartridge 10 that includes a sonic receiver 11 in the form of cylindrically-shaped depression in the sidewall 17 of the container 12. In this embodiment, the depression extends into contact with a filter 30 in the container 12, although the depression need not contact the filter 30. In the FIGS. 11 and 12 embodiments, as with other embodiments, the sonic receiver 11 may include more than just the depression. For example, an acoustically coupling gel or other substance could be placed in the depression and used to acoustically couple the sonic emitter 53 with the cartridge interior. In other embodiments, the sonic receiver 11 may include only the acoustic coupling gel, e.g., applied to the exterior of a cartridge, or any other suitable acoustic coupling material, such as water. FIG. 13 shows a front view and FIG. 14 shows a bottom view of a cartridge 10 that includes a sonic receiver 11 in the form of a cylindrically-shaped depression that extends upwardly from the bottom 16 of the container 12. In this embodiment, the depression does not extend to the filter 30, but the depression could optionally extend to the filter 30 or beyond the filter 30 and into a space above the filter 30. FIG. 15 shows a front view and FIG. 16 shows a top view of a cartridge 10 that includes a sonic receiver 11 in the form of cylindrically-shaped depression that extends downwardly from the lid 38 into the interior space of the container 12. The sonic receiver 11 in this embodiment may include a cylindrically-shaped cup that is attached to a hole in the lid 38, or may be molded or otherwise formed into the lid material.

Of course, it should be understood that the sonic receivers 11 may be arranged to have other sizes, shapes or other configuration details as discussed above. Moreover, two or more sonic receivers 11 may be provided, and the sonic receivers 11 may have different positions on the container, different sizes, shaped, etc. The sonic receivers 11 may include acoustically compliant portions, or not, as desired. In the absence of an acoustically compliant portion, the sonic receivers 11 may receive or otherwise couple with a sonic emitter 53 so as to enable the sonic emitter 53 to introduce sonic energy into the cartridge 10.

In other illustrative embodiments, a sonic receiver 11 may be arranged to be received by a sonic emitter 53 rather than to receive the sonic emitter 53. FIGS. 17-19 show a front view with a cartridge 10 engaged with a sonic emitter 53, a front view of the cartridge 10 alone, and a bottom view of the cartridge 10, respectively in another illustrative embodiment. In contrast to the embodiments shown in FIGS. 5-16, the embodiment in FIGS. 17-19 has a sonic receiver 11 arranged to be at least partially surrounded by a sonic emitter 53. That is, the lower portion of the container 12 is arranged to form a sonic receiver 11 that is inserted into a cavity of a sonic emitter 53. A portion of the sonic emitter 53 may include one or more beverage outlets 52, although other arrangements are possible, such as where a beverage exits from the lid 38 or sidewall 17 of the cartridge 10. With the sonic receiver 11 at least partially surrounded by the sonic emitter 53, the emitter 53 may transmit sonic energy into the cartridge 10 from one or more regions around the exterior of the sonic receiver 11, including the bottom 16 of the container 12. In other arrangements, such as that shown in FIG. 20, the bottom of the container 12 may extend from the sonic emitter 53, e.g., allowing beverage to exit the container 12 without passing through the sonic emitter 53. Although the embodiments in FIGS. 17-20 show the sonic receiver 11 arranged to have a cylindrical shape, other shapes are possible, such as a tapered conical shape like that shown in FIGS. 21-23. FIGS. 21-23 show a front view with a cartridge 10 engaged with a sonic emitter 53, a front view of the cartridge 10—alone, and a bottom view of the cartridge 10, respectively. The tapered shape of the sonic receiver 11 in this embodiment may allow the sonic emitter 11 to fit snugly against the sonic emitter 53, which may enhance the acoustic coupling between the sonic emitter 53 and the cartridge interior. Coupling between the sonic emitter 53 and the cartridge may be enhanced in this or other embodiments in other ways, such as by using a compliant coupling medium (such as a silicone or rubber material as part of the sonic receiver 11 that interfaces with emitter 53), use of a liquid coupling medium (such as water), using a sonic emitter 53 that has a portion that enlarges or reduces in size to clamp within or around the receiver 11, etc.

Figure 24:
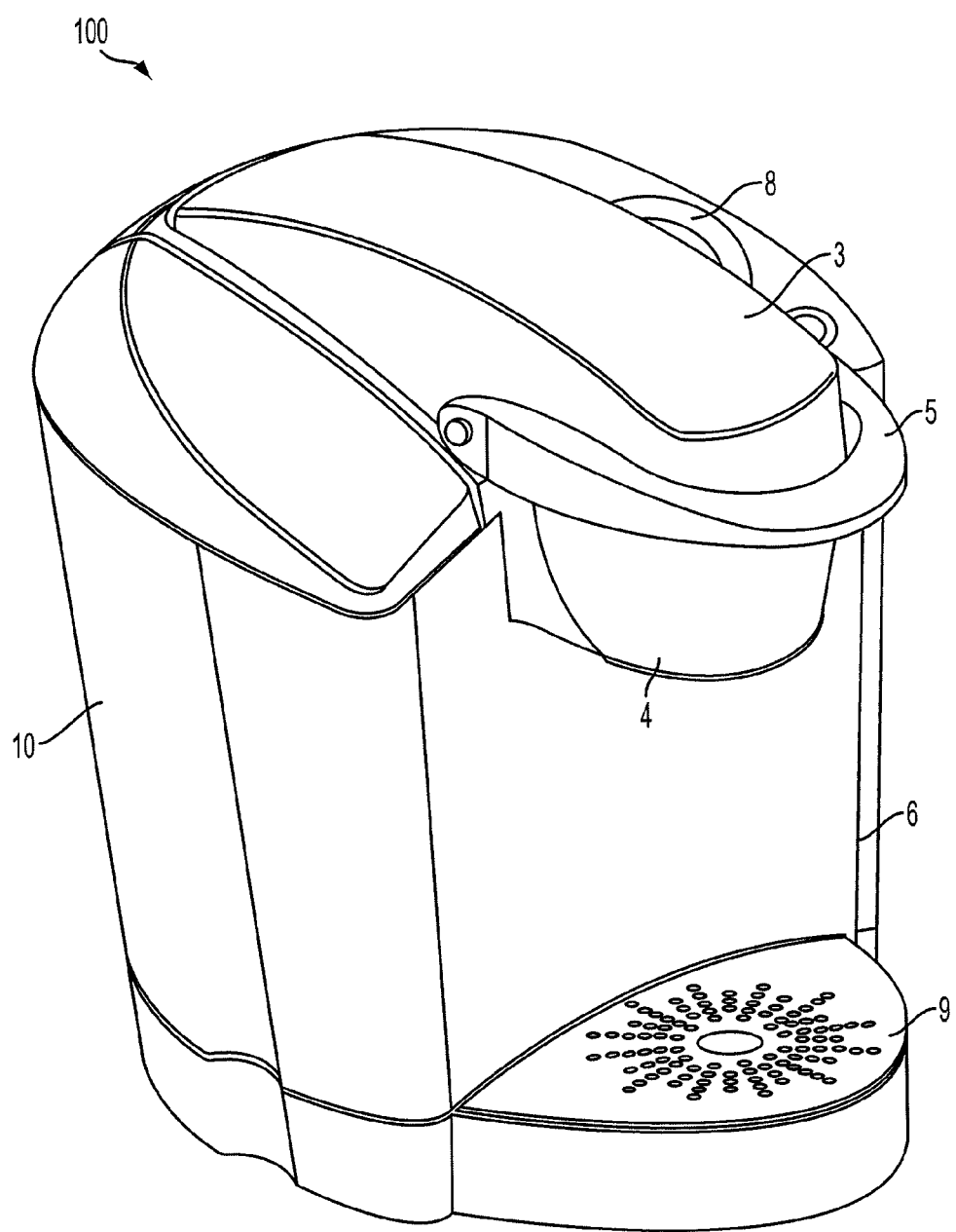
FIG. 24 shows a perspective view of a beverage forming apparatus for use in aspects of the invention.

Cartridges in accordance with aspects of the invention may be used with any suitable beverage machine. For example, FIG. 24 shows a perspective view of a beverage forming apparatus 100 that may be used to form any suitable beverage, such as tea, coffee, other infusion-type beverages, beverages formed from a liquid or powdered concentrate, hot or cold drinks, etc. In this illustrative embodiment, the apparatus 100 includes an outer frame or housing 6 with a user interface 8 that the user may operate to control various features of the apparatus 100. A beverage cartridge 10 may be provided to the apparatus 100 and used to form a beverage that is deposited into a cup or other suitable receptacle that is placed on a drip tray 9 or other support, if any. The cartridge 10 may be manually or automatically placed in a cartridge receiving portion defined by first and second portions 3 and 4 of the beverage forming apparatus 100. For example, by lifting a handle 5, the user may move the first and second portions 3 and 4 to an open position to expose a suitably shaped area in which the cartridge 10 may be placed. After placement of the cartridge 10, a handle 5 or other actuator may be moved in a manual or automatic fashion so as to move the first and second portions 3 and 4 to a closed position (shown in FIG. 24), thereby at least partially enclosing the cartridge 10 within a brew chamber. It should be understood, however, that the cartridge 10 may be received in any suitable way by the apparatus 100, as the way in which the apparatus 100 receives or otherwise uses the cartridge 10 is not critical to aspects of the invention.

Once the cartridge 10 is received, the beverage forming apparatus 100 may use the cartridge 10 to form a beverage. For example, one or more inlet needles 50 (see FIG. 3 or 4) associated with the first or second portion 3, 4 may pierce the cartridge 10 so as to inject heated water or other liquid into the cartridge 10. The first or second portion 3, 4 may also include one or more outlet needles or other elements 52 to puncture or pierce the cartridge 10 (as needed) at an outlet side to permit the formed beverage to exit the cartridge 10. If the inlet and outlet are provided at a same side of the cartridge 10, such as at the lid 38 shown in FIG. 3, the cartridge 10 may be oriented during beverage formation so that the lid 38 is below the bottom 16 or is otherwise oriented so that beverage can be suitably removed from the cartridge 10.

Figure 25:
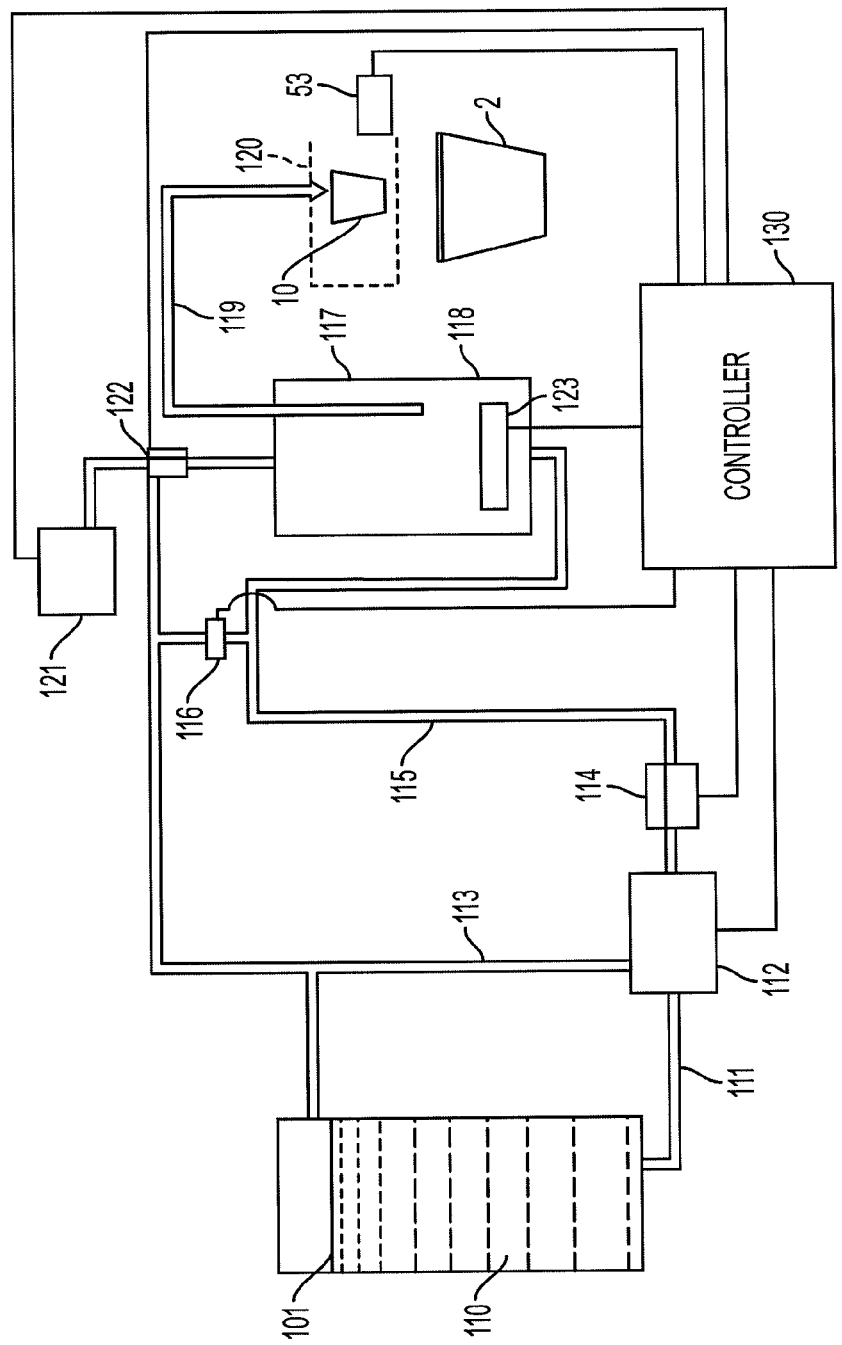
FIG. 25 is a schematic block diagram of components of a beverage forming apparatus usable in accordance with aspects of the invention.

FIG. 25 shows a schematic block diagram of various components included in a beverage forming apparatus 100 in one illustrative embodiment, such as that in FIG. 24. Those of skill in the art will appreciate that a beverage forming apparatus 100 may be configured in a variety of different ways, and thus aspects of the invention should not be narrowly interpreted as relating only to one type of beverage forming apparatus. Water or other liquid from a storage tank 110 may be provided via a supply conduit 111 to a pump 112 (such as a centrifugal pump, piston pump, solenoid pump, etc.), which pumps the liquid via a pump conduit 115 to a metering tank or chamber 118. Operation of the water pump 112 and other components of the apparatus 100 may be controlled by a controller 130, e.g., including a programmed processor and/or other data processing device along with suitable software or other operating instructions, one or more memories (including non-transient storage media that may store software and/or other operating instructions), temperature and liquid level sensors, pressure sensors, input/output interfaces, communication buses or other links, a display, switches, relays, triacs, or other components necessary to perform desired input/output or other functions. The metering tank 118 may be filled with a desired amount of liquid by any suitable technique, such as running the pump 112 for a predetermined time, sensing a water level in the metering tank 118 using a conductive probe sensor or capacitive sensor, detecting a pressure rise in metering tank 118 when the liquid fills the tank, or using any other viable technique. For example, the controller 130 may detect that the metering tank 118 is completely filled when a pressure sensor detects a rise in pressure indicating that the water has reached the top of the metering tank 118. Water in the tank may be heated, if desired, by way of a heating element 123 whose operation is controlled by the controller 130 using input from a temperature sensor or other suitable input. Water in the metering tank 118 may be dispensed via a metering tank conduit 119 to a brew chamber 120 or other beverage forming station. The brew chamber 120 may include any beverage making ingredient, such as ground coffee, tea, a flavored drink mix, or other substance, e.g., contained in a cartridge 10. Liquid may be discharged from the metering tank 118 by pressurizing the metering tank with air provided by an air pump 121 that causes the liquid to be discharged out of a tube 117 and into the metering tank conduit 119. Completion of the dispensing from the metering tank 118 may be detected in any suitable way, such as by detecting a pressure drop in the metering tank 118, by detecting a water level change in the metering tank 118, use of a flow meter, or using any other viable techniques. Liquid may alternately be discharged from the metering tank 118 by the pump 112 operating to force additional liquid into the tank 118, thereby displacing water out of the tank 118 and to the brew chamber. A flow sensor or other suitable device may be used to determine the amount of liquid delivered to the tank 118, and thus the amount of liquid delivered to the brew chamber. Alternately, the pump 12 may be a piston-type or metering pump such that a known volume of liquid may be delivered from the pump 112 to the tank 118, thus causing the same known volume to be delivered to the brew chamber 120. Liquid may be introduced into the cartridge 10 at any suitable pressure, e.g., 1-2 psi or higher.

The beverage forming apparatus 100 may also include one or more sonic emitters 53 to interact with the cartridge 10 during beverage formation. The sonic emitter 53 may be moveable so as to move into contact with or otherwise suitable position relative to the cartridge 10 in the brew chamber 120, or may be stationary with the cartridge 10 moved into suitable position relative to the emitter 53. The sonic emitter 53 may include any suitable components, such as one or more piezoelectric elements that function as an ultrasonic transducer, an electromagnetic device (such as a speaker driver) that produces ultrasonic energy, a mechanical device that produces ultrasonic energy (such as a motor driven rod or other component that is caused to vibrate at a suitable frequency), and so on. The sonic emitter 53 may also include one or more acoustic coupling components, such as a rubber gasket, water bath or other element that helps to couple acoustic energy to the cartridge 10. The controller 130 may also include a suitable control or driver circuit to cause the sonic emitter 53 to emit sonic energy. In one embodiment, the sonic emitter 53 can include an ultrasonic vibratory transducer such as a Model XL-2000 model with probe specifications of a CML-4 with a P-1 microprobe, manufactured and obtained from Qsonica, LLC. This ultrasonic transducer operates at frequencies of about 22 kHz.

Figure 26:
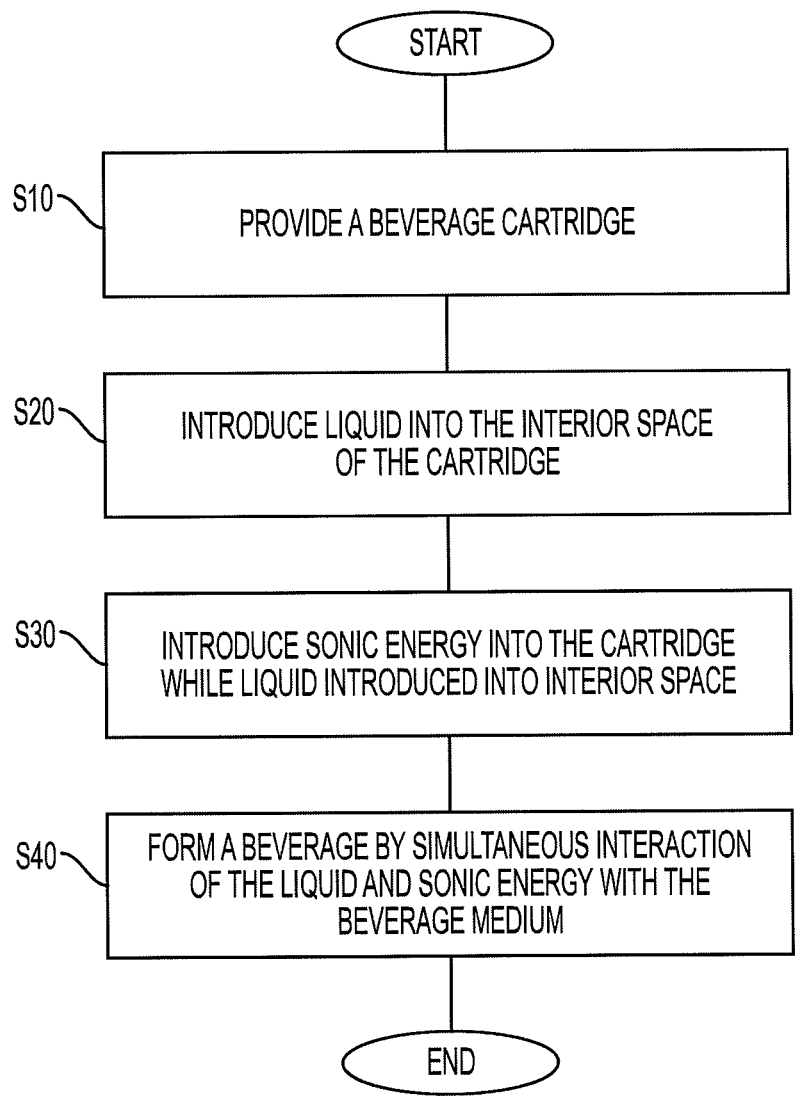
FIG. 26 shows steps in a method of preparing a beverage in accordance with aspects of the invention.

In other aspects of the invention, methods for forming a beverage using a cartridge and sonic energy are provided. Some embodiments in this regard may provide one or more of the following advantages: (1) increasing the speed of forming a beverage, (2) increasing the strength of a beverage, (3) producing different qualities of beverages, and (4) increasing the degree of extraction of a beverage material during brewing. In one embodiment shown in FIG. 26 a method for forming a beverage includes, in step S10, providing a beverage cartridge arranged for use in a beverage forming machine to make a beverage. The cartridge may include a container having a closed interior space and a beverage medium located in the interior space. As discussed above, the cartridge may take any of a variety of forms, e.g., may be permeable or impermeable, may have a sachet, pod, or other form, may include relatively rigid and/or flexible elements, may be arranged to maintain a specific shape or shapeless, may include a filter or not, if a filter is included, it may be located in the interior space of the cartridge and/or at the cartridge exterior (e.g., like that in many beverage pods), and so on.

In some embodiments, the cartridge may include a sonic receiver attached to the container and arranged to transmit sonic energy from a sonic emitter located outside of the closed interior space into the interior space for interaction with the beverage medium. For example, the cartridge may include an acoustically compliant portion that is arranged to vibrate in response to exposure to acoustic energy so that the acoustically compliant portion introduces sonic energy having a desired frequency and/or intensity into the interior space of the cartridge. The acoustically compliant portion may have a physical structure, material composition or arrangement, or other features that allow the acoustically compliant portion to operate as desired.

In other embodiments, a sonic receiver of the cartridge may include a notch, groove, recess, or other depression in a portion of the container, such as a sidewall, bottom, lid or other part of the cartridge. (It should be understood that a cartridge need not include a bottom, sidewall and/or lid. Some embodiments, such as a spherically shaped container, may not have any defined bottom or lid, for example.) In other embodiments, the sonic receiver may include a protrusion or other portion that is received by a sonic emitter, e.g., a portion of the container may be received into a hole, recess or other depression of the sonic emitter. The sonic receiver may be transparent, or substantially transparent to acoustic energy emitted by the sonic emitter, allowing the sonic emitter to introduce sonic energy directly into the cartridge.

In step S20, liquid may be introduced into the closed interior space of the cartridge. Any suitable liquid may be introduced into the interior space, such as water, filtered, carbonated or otherwise processed water, milk, juice, coffee extract, etc. Introduction of the liquid may be done in any suitable way, such as by piercing the container, e.g., with a needle, and injecting liquid into the closed interior space. In other embodiments, pressurized liquid may be applied to the exterior of the cartridge container to cause one or more openings to form so as to admit the liquid. In other embodiments, the liquid may be simply poured into the cartridge, e.g., where a lid of the cartridge is removed to allow water to be poured into the cartridge. The liquid may be introduced under pressure, e.g., 1-2 psi or more, and may be introduced at any suitable flow rate and along with any other suitable materials, such as air bubbles entrained in the liquid, solid materials suspended in the liquid, etc.

In step S30, sonic energy may be introduced into the closed interior space of the cartridge while liquid introduced into the closed interior space is present in the cartridge. Sonic energy may be introduced in any of the ways described above, including inserting an ultrasonic emitter probe into the cartridge, positioning a sonic emitter in contact with or suitably near a sonic receiver of the cartridge, and so on. Sonic energy may be transmitted directly through the container, or may be introduced by an acoustically compliant portion of the cartridge that vibrates in response to exposure to sonic energy and by the vibration introduces sonic energy into the interior space.

In step S40, a beverage may be formed by simultaneous interaction of the liquid and sonic energy with the beverage medium. This step may include a variety of different features, such as causing materials to pass through a filter in the cartridge that would not pass through the filter in the absence of the sonic energy. For example, the beverage may be formed with a higher level of dissolved and/or suspended materials than would be present in the absence of the sonic energy. In other embodiments, the beverage may have a turbidity and/or a level of total dissolved solids that is higher than would be present in the absence of the sonic energy. In yet other embodiments, the step of forming a beverage may include causing flow of beverage medium and liquid in the interior space by exposing the interior space to the sonic energy. For example, while introducing liquid into the interior space typically will cause flow of beverage medium and liquid in the interior space, the sonic energy introduced into the cartridge may cause additional flow or other movement of beverage medium and liquid in the interior space. Such additional movement may help dissolve materials in the beverage medium and/or otherwise cause faster or more efficient extraction of materials from the beverage medium.

The inventors have performed experiments described below. These experiments are not intended to limit the scope of aspects of the invention, but rather provide support for some of the aspects of the invention described and claimed herein.

Example 1

18 K-Cup brand cartridges of a decaffeinated Arabica medium roast and ground coffee were obtained from standard product-for-sale by Green Mountain Coffee Roasters, Inc. (GMCR) under the trade name "Breakfast Blend Decaf." Nine of the cartridges were brewed at the 192 deg F. water temperature at the 8 ounce setting on a "Platinum" Single Cup Coffee Brewer which is also sold by GMCR. These nine brewed samples are the "control".

The next nine samples were also brewed on the Platinum brewer, but were subjected to externally-applied sonic energy. To apply the energy during brewing, the brewer was modified by removing the plastic housings surrounding the cartridge brew chamber, such that the sidewall of the cartridge was exposed. A "Sonicare Toothbrush" manufactured by Philips was obtained from standard product-for-sale at a retail store. The toothbrush was assembled with the brush head in place. During brewing, the back of the head of the brush (not the bristles) was pressed against the exposed wall of the cartridge and the power was switched "on". In this instance, there was no notch or other depression in the cartridge. The sonically-vibrating head was kept pressed against the cartridge during the entire brew cycle. The wall of the cartridge vibrated due to the action of the sonic vibrations of the brush head, as evidenced by simply touching and sensing the vibrations with a finger. The nine sonically-brewed samples are the "test".

Both the control and the test brewed coffee samples were analyzed for turbidity measurements in "NTU's". "NTU" units are Nephelometric Turbidity Units. These were measured using a HACH model 2100N Turbidimeter, available from Hach Company. The NTU values were measured on the coffee about 5 minutes after brewing the coffee.

The Results of the NTU Measurements are:
Control: 37.7, 32.8, 34.4, 39.4, 31.2, 33.8, 34.0, 47.0, 31.3
Test: 63.9, 62.1, 49.5, 46.9, 41.8, 59.8, 57.3, 66.7, 54.7
Control Mean: 35.7
Test Mean: 55.9

One skilled in coffee technology will recognize that the coffee became more turbid as sonic power was externally applied. One skilled in coffee technology would recognize that increased turbidity is an indicator of increased coffee strength, and can be caused by suspended solids, oils and other "colloidal" substances. Surprisingly, the application of sonic energy appears to have enhanced the ability of colloidal substances to pass through a coffee filter such as a paper coffee filter. The inventors can postulate that possibly the sonic energy modified the colloidal substances and/or agitated the beverage materials to release the colloidal material and pass them through the filter.

Example 2

6 K-Cup brand cartridges each including about 12 grams of dark roast and ground coffee were obtained from standard product-for-sale by Green Mountain Coffee Roasters, Inc. (GMCR) and were brewed at the 192 deg F. water temperature at the 8 ounce setting on a "B80" Coffee Brewer sold by Keurig, Incorporated. During brewing, a sonic emitter in the form of a "sonicator" Model XL-2000 model with probe specifications of a CML-4 with a P-1 microprobe, manufactured and obtained from Qsonica, LLC, was inserted through the lid of each cartridge and into the interior space about 0.25 inches. The total brew time for all power levels was about 35 seconds. The sonic energy was applied starting at about 5 seconds after the water flow was initiated and then stopped at the very end of the 35 second period. Each cartridge was brewed while the sonicator was provided with different power levels, i.e., 0, 5, 7, 11. 15 and 40 watts. Turbidity measurements (in "NTU" units) of the resulting coffee solutions were measured using a HACH model 2100N Turbidimeter, available from Hach Company about 5 minutes after brewing the coffee. "Total Dissolved Solids" (TDS) measurements were also made of the same brewed coffee samples. These measurements were also taken at about 5 minutes after brewing the coffee using a model Ultrameter II 6PII CE, available from Myron L Company. The results of the NTU and TDS measurements for the six cartridges were about:
NTU: 70, 140, 210, 290, 350, 410
TDS: 1.130, 1.110, 1.125, 1.112, 1.122, 1.190
Watts: 0, 5, 7, 11. 15, 40

One skilled in coffee technology will recognize that the coffee became more turbid as sonic power was increased. One skilled in coffee technology will also recognize that increased turbidity is an indicator of increased coffee strength, and can be caused by suspended solids, oils and other "colloidal" substances. Brewed coffee with sonic energy application was tasted relative to coffee in which no sonic power was applied, and was found to taste stronger when such sonic energy was applied. Surprisingly, the application of sonic energy appears to have enhanced the ability of colloidal substances to pass through a coffee filter such as a paper coffee filter. One skilled in coffee technology recognizes that paper-filtered coffee can suffer from weak taste due to the lack of such colloidal or turbidity-causing substances. The inventors can postulate that possibly the sonic energy modified the colloidal substances and/or agitated the beverage materials to release the colloidal material and pass them through the filter.

Regarding TDS, at the highest power setting between 40 and 45 watts, a dramatic increase in dissolved solids was achieved (1.190% dissolved solids) versus 1.130% dissolved solids when no power was applied. Surprisingly, lower levels of dissolved solids were achieved at power settings below 20 watts. A visual examination of the bed of coffee grounds after sonic brewing (by peeling the lid from the cartridge) showed that a channel or tunnel was formed through the bed, most likely caused by the sonic energy emanating from the tip of the probe. The inventors can postulate that the open channel or tunnel caused a portion of the water to more quickly pass through the bed of coffee and thus drop the overall extraction efficiency of dissolved solids. Yet, even though a drop in extraction efficiency of dissolved solids was observed, the extraction/suspension of turbidity-effecting substances was not, which is an entirely unanticipated result.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. A method of forming a beverage, comprising:
   providing a beverage cartridge arranged for use in a beverage forming machine to make a beverage, the cartridge including a container having a closed interior space and a beverage medium located in the interior space;
   introducing liquid into the closed interior space of the cartridge;
   using a sonic emitter adjacent to the cartridge to provide sonic energy to an exterior of the cartridge, the sonic emitter being adjacent to the cartridge only when the cartridge is held in the beverage forming machine;
   transmitting the sonic energy into the closed interior space of the cartridge while liquid introduced into the closed interior space is present in the cartridge; and
   forming a beverage by simultaneous interaction of the liquid and sonic energy with the beverage medium; wherein
   the cartridge includes a sonic receiver attached to the container and arranged to transmit sonic energy from the sonic emitter located outside of the closed interior space into the interior space for interaction with the beverage medium; and
   the sonic receiver includes a depression in a sidewall of the container.

2. The method of claim 1, wherein the sonic receiver includes an acoustically compliant portion of the cartridge that is excited by sonic energy.

3. The method of claim 1, wherein the step of introducing liquid includes:
   piercing the container; and
   injecting liquid into the closed interior space.

4. The method of claim 1, wherein the step of forming a beverage includes:
   causing materials to pass through a filter in the cartridge that would not pass through the filter in the absence of the sonic energy.

5. The method of claim 1, wherein the step of forming a beverage includes:
   forming a beverage that has a higher level of dissolved and/or suspended materials than would be present in the absence of the sonic energy.

6. The method of claim 1, wherein the sonic emitter includes an ultrasonic probe.

7. The method of claim 1, wherein the beverage is a coffee beverage and the step of forming the beverage includes:
   forming a coffee beverage with a turbidity and/or a level of total dissolved solids that is higher than would be present in the absence of the sonic energy.

8. The method of claim 1, wherein the step of transmitting includes:
   exciting an acoustically compliant portion of the cartridge with the sonic energy.

9. The method of claim 1, wherein the step of transmitting includes:
   causing flow of beverage medium and liquid in the interior space by exposing the interior space to the sonic energy.

10. The method of claim 1, wherein using a sonic emitter adjacent to the cartridge to provide sonic energy to an exterior the cartridge comprises contacting the sonic emitter with the beverage cartridge.

11. The method of claim 1, wherein the beverage forming machine includes the sonic emitter, and the sonic emitter is located at a cartridge receiver and is positioned to be adjacent the cartridge when the cartridge is in the cartridge receiver.

* * * * *